(12) United States Patent
Meissner et al.

(10) Patent No.: US 11,453,577 B2
(45) Date of Patent: Sep. 27, 2022

(54) VEHICLE CRANE SYSTEM FOR TRANSPORTING AN ATTACHMENT PART, IN PARTICULAR A MAIN JIB OF A VEHICLE CRANE

(71) Applicant: Tadano Demag GmbH, Zweibrücken (DE)

(72) Inventors: Klaus Meissner, Zweibrücken (DE); Matthias Roth, Waldmohr (DE); Klaus Königstein, Martinshöhe (DE)

(73) Assignee: Tadano Demag GmbH, Zweibrücken (DE)

( * ) Notice: Subject to any disclaimer, the term of this patent is extended or adjusted under 35 U.S.C. 154(b) by 0 days.

(21) Appl. No.: 17/266,426

(22) PCT Filed: Aug. 1, 2019

(86) PCT No.: PCT/EP2019/070761
§ 371 (c)(1),
(2) Date: Feb. 5, 2021

(87) PCT Pub. No.: WO2020/030521
PCT Pub. Date: Feb. 13, 2020

(65) Prior Publication Data
US 2021/0292135 A1 Sep. 23, 2021

(30) Foreign Application Priority Data
Aug. 8, 2018 (DE) .......................... 102018119315.7

(51) Int. Cl.
*B66C 23/36* (2006.01)
*B60P 3/28* (2006.01)
*B66C 23/38* (2006.01)

(52) U.S. Cl.
CPC .............. *B66C 23/365* (2013.01); *B60P 3/28* (2013.01); *B66C 23/38* (2013.01)

(58) Field of Classification Search
CPC ....... B66C 23/365; B66C 23/26; B66C 23/38; B60P 3/28
See application file for complete search history.

(56) References Cited

U.S. PATENT DOCUMENTS 4,290,495 A * 9/1981 Elliston ................. E21B 19/084
173/147
4,565,291 A 1/1986 Khirwadkar
(Continued)

FOREIGN PATENT DOCUMENTS

DE 2833535 A1 2/1980
DE 3532296 A1 3/1987
(Continued)

OTHER PUBLICATIONS

International Search Report of the International Searching Authority from corresponding Patent Cooperation Treaty (PCT) Application No. PCT/EP2019/070761, indicated completed on Oct. 17, 2019.
(Continued)

*Primary Examiner* — Emmanuel M Marcelo
(74) *Attorney, Agent, or Firm* — Gardner, Linn, Burkhart & Ondersma LLP

(57) ABSTRACT

A vehicle crane system includes a vehicle crane having a detachable attachment part, in particular a main jib, and an attachment part transporting unit which is designed to receive the attachment part when the latter is detached from the vehicle crane and comprises a mobile transporting device for transporting the attachment part. To remove and mount the attachment part of the vehicle crane and to transport it, the transporting device is equipped with at least one loading arm, the free supporting end of which is provided for at least indirect temporary coupling to an attachment part which is to be received or is already received. The loading arm is mounted pivotably on the transporting device such that an attachment part to be loaded (Continued)

or unloaded can be moved down onto the transporting device or from the transporting device.

20 Claims, 7 Drawing Sheets

(56) References Cited

U.S. PATENT DOCUMENTS

| | | | |
|---|---|---|---|
| 7,568,881 B1 | 8/2009 | Collins | |
| 2010/0140949 A1* | 6/2010 | Pitre | F03D 13/20 290/55 |
| 2017/0334332 A1* | 11/2017 | Iotti | B60P 7/0807 |
| 2021/0221658 A1 | 7/2021 | Königstein | |
| 2021/0292136 A1 | 9/2021 | Meissner et al. | |

FOREIGN PATENT DOCUMENTS

| | | | | |
|---|---|---|---|---|
| DE | 19823380 A1 | | 3/1999 | |
| DE | 20013893 U1 | * | 12/2001 | ........... B66C 23/365 |
| DE | 202014007007 U1 | | 11/2014 | |
| DE | 102014009564 A1 | | 12/2015 | |
| EP | 0867399 A1 | | 9/1998 | |
| EP | 2248754 A1 | * | 11/2010 | ........... B66C 23/344 |
| FR | 2759040 A1 | | 8/1998 | |
| JP | S5032639 A | | 3/1975 | |
| JP | S50102061 U | | 8/1975 | |
| WO | WO-2016152770 A1 | * | 9/2016 | ............. B66C 23/26 |

OTHER PUBLICATIONS

International Written Opinion of the International Searching Authority from corresponding Patent Cooperation Treaty (PCT) Application No. PCT/EP2019/070761, indicated completed on Oct. 17, 2019.

Preliminary Report on Patentability of the International Searching Authority in English from corresponding Patent Cooperation Treaty (PCT) Application No. PCT/EP2019/070761, completed Feb. 9, 2021.

* cited by examiner

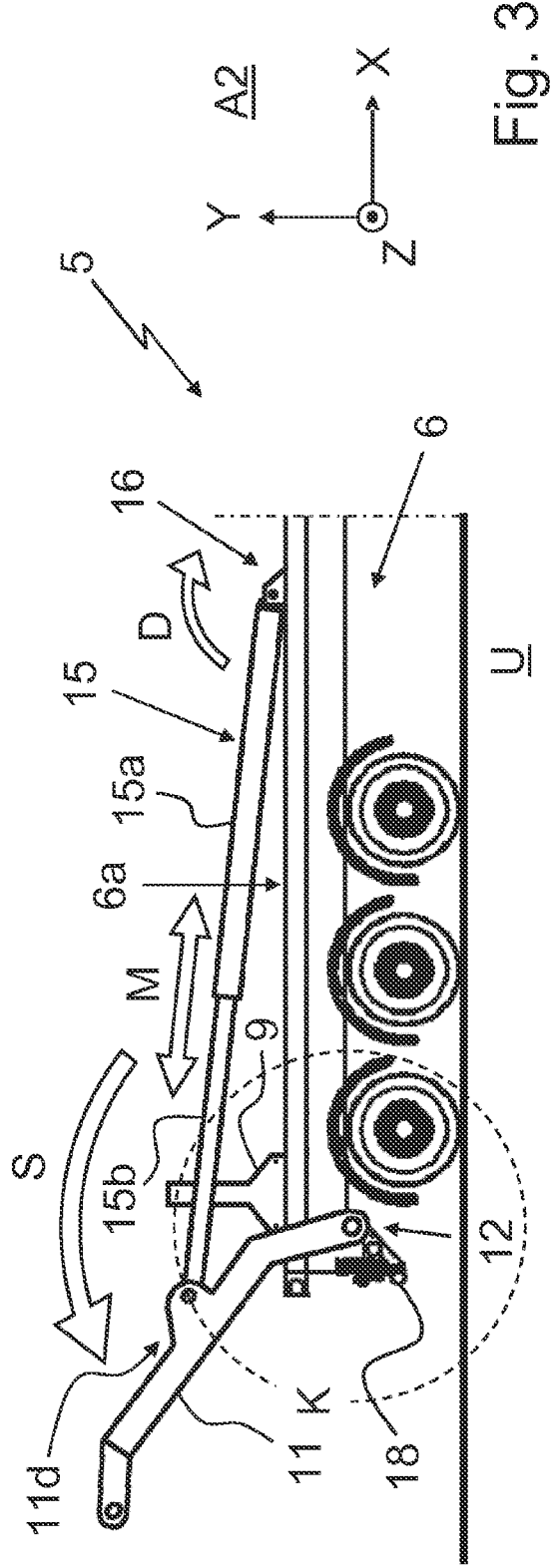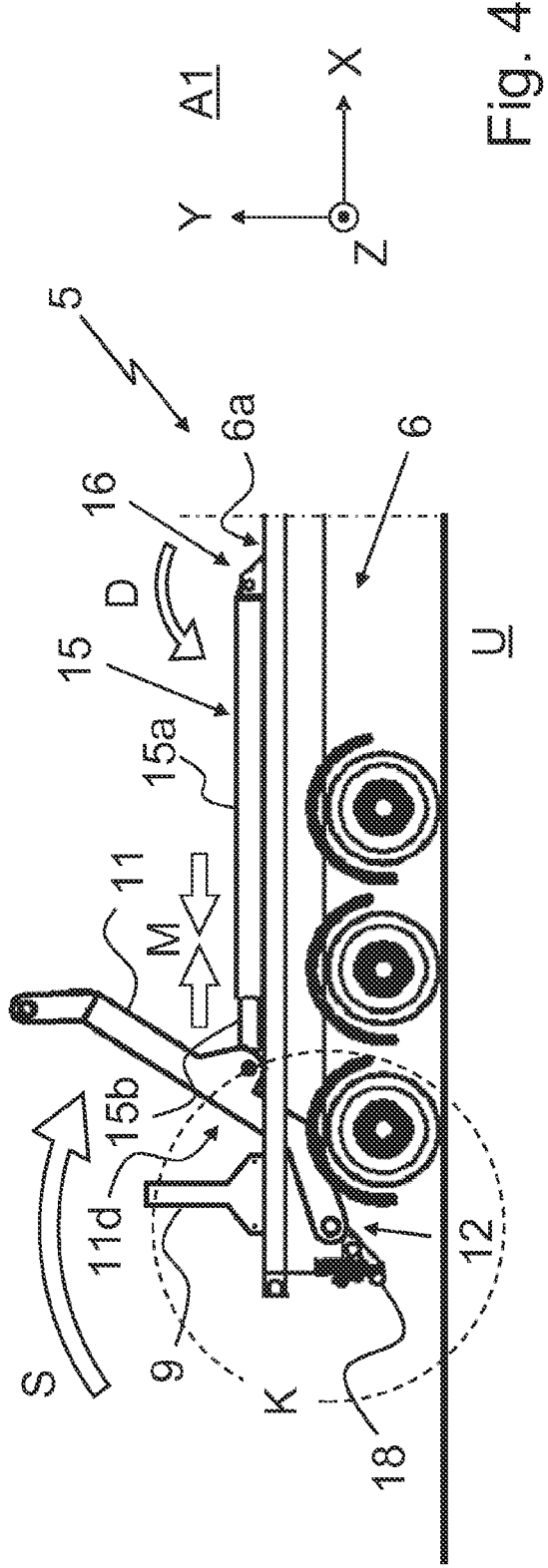

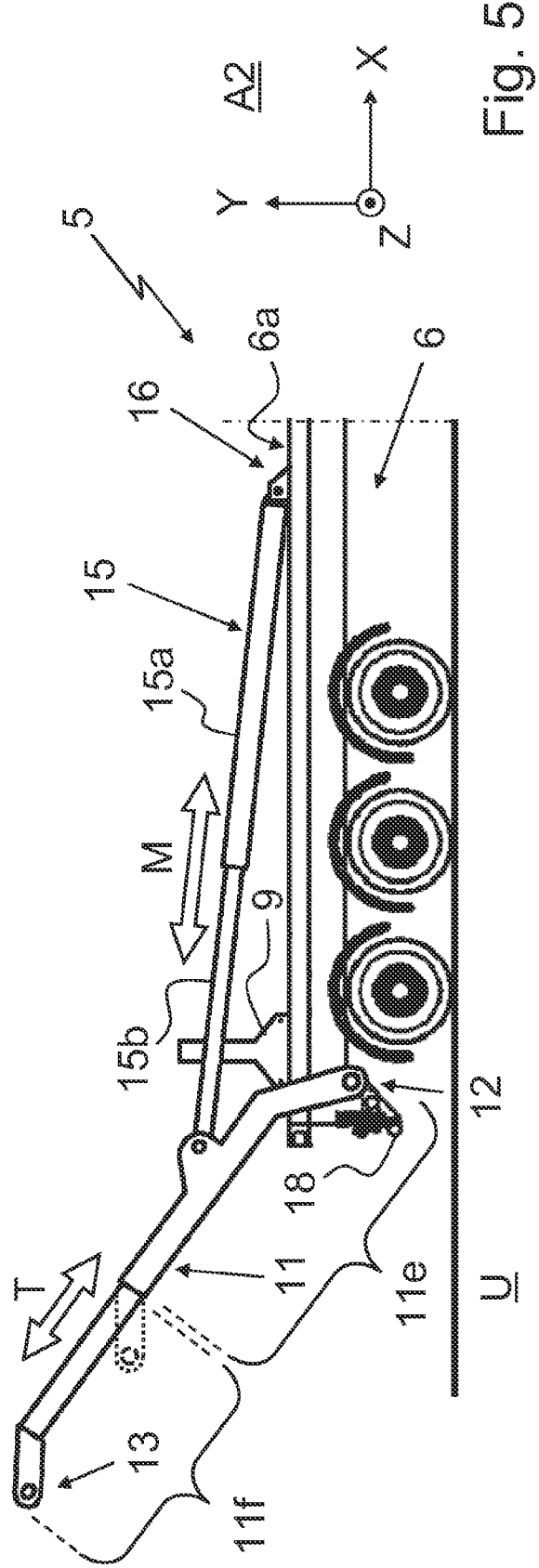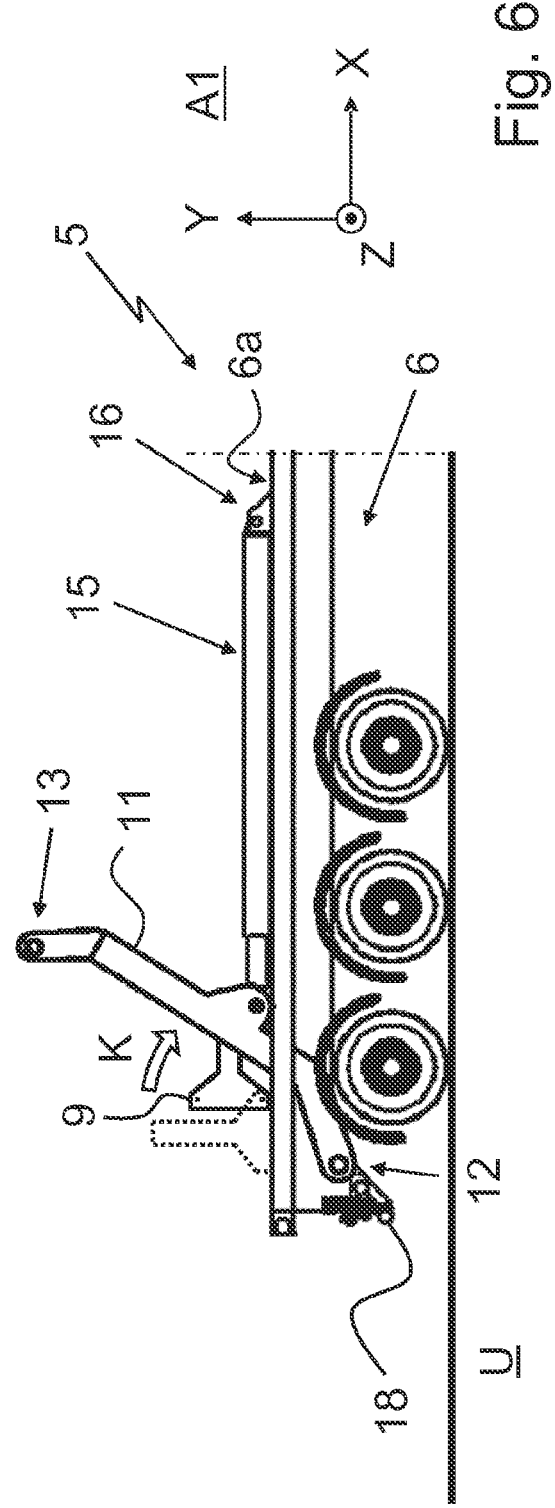

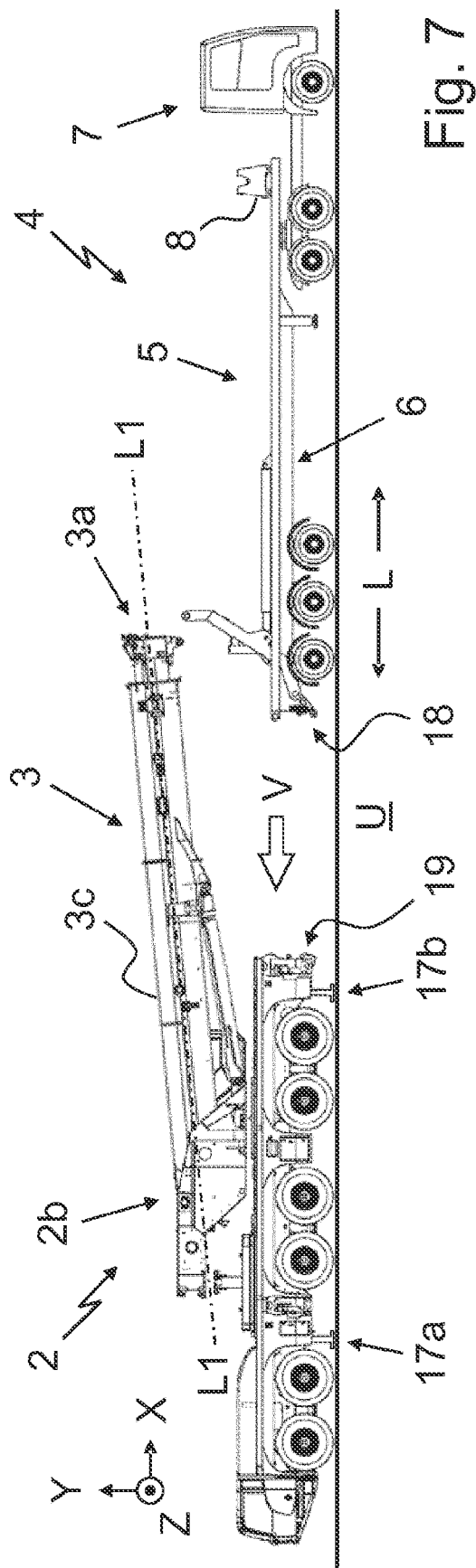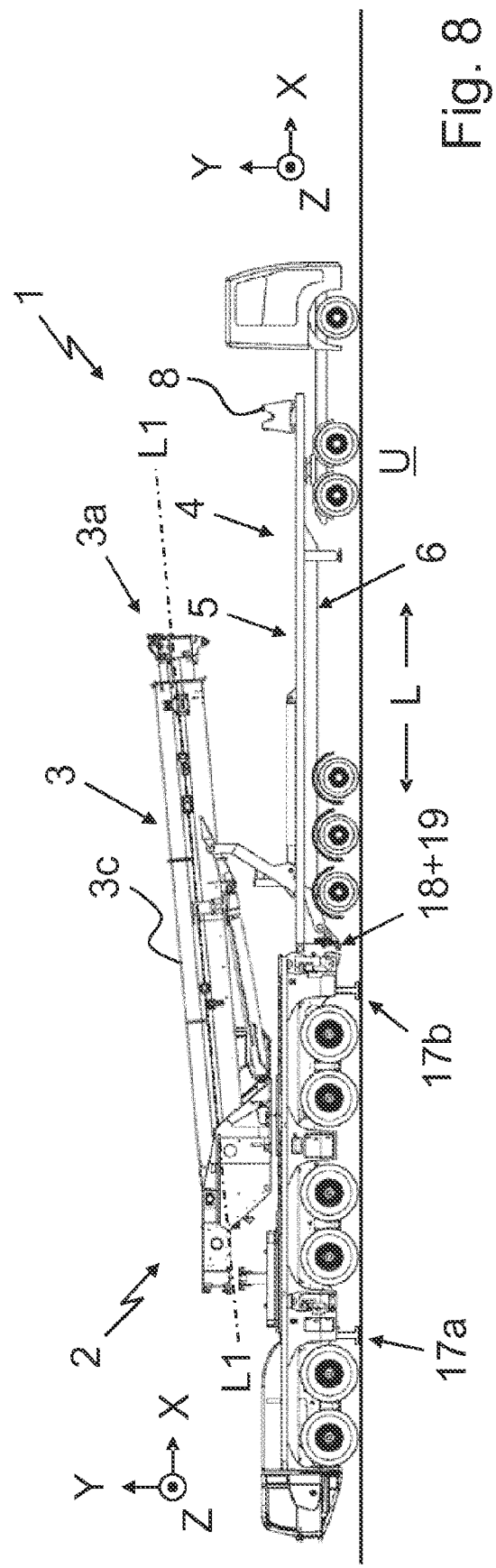

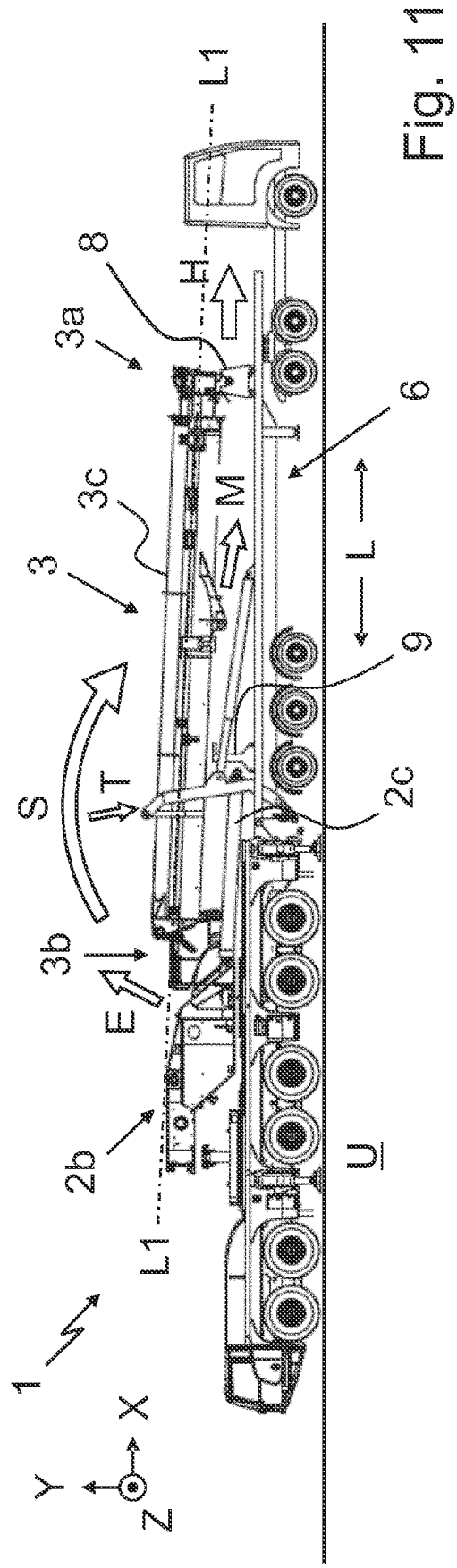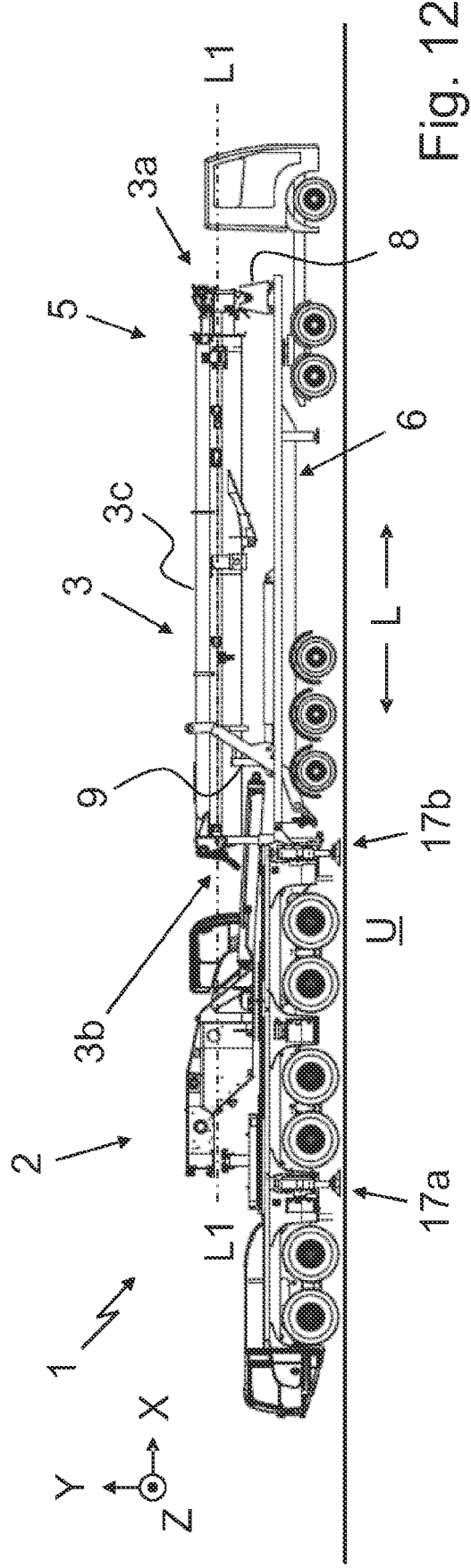

US 11,453,577 B2

VEHICLE CRANE SYSTEM FOR TRANSPORTING AN ATTACHMENT PART, IN PARTICULAR A MAIN JIB OF A VEHICLE CRANE

CROSS REFERENCE TO RELATED APPLICATION

The present application claims the priority benefits of International Patent Application No. PCT/EP2019/070761, filed Aug. 1, 2019, and claims benefit of German Patent Application No. DE102018119315.7, filed Aug. 8, 2018.

BACKGROUND AND FIELD OF THE INVENTION

The invention relates to a vehicle crane system, comprising a vehicle crane having a detachable attachment part, in particular a main jib, and an attachment part-transport unit which is designed to receive the attachment part detached from the vehicle crane. Furthermore, the invention relates to a method for receiving an attachment part, which can be detached from a vehicle crane, in the form of a main jib onto a transport apparatus of an attachment part-transport unit. The invention also relates to a method for connecting an attachment part, which is received on a transport apparatus of an attachment part-transport unit, in the form of a main jib.

It is generally known that vehicle cranes, in particular mobile cranes, arrive at their different places of usage for the most part using public roads. The use thereof requires a maximum axle load to be observed, wherein in particular travel over bridges is also restricted to a maximum vehicle weight. If the actual axle load or the permissible vehicle weight exceed the respective permissible values, they must be reduced accordingly. In order to meet the official regulations, vehicle cranes affected by this are typically designed such that at least one of their assemblies can be removed. A significant weight reduction can be achieved e.g. by removing the main jib which, for this purpose, can be arranged in a correspondingly detachable manner on a mostly pivotable superstructure of the vehicle crane. For this purpose, by reason of the dimensions and measurements of the parts of such a vehicle crane which are to be moved, suitable apparatuses are required in order to permit practicable mounting and removal of the main jib on site along with the transport thereof which is effected separately from the rest of the vehicle crane.

In this respect, German laid-open document DE 198 23 380 A1 discloses a crane jib-transport unit having a mobile transport apparatus in the form of a semi-trailer for transporting a main jib which is separated from a vehicle crane. Arranged on the transport apparatus is a storage block, on which the main jib can be supported as an attachment part of the vehicle crane in the region of its head end. Further support is effected via a lattice-like storage device which is arranged on the transport apparatus and by means of which the main jib can be supported on a basic box located between the head end and its foot end opposite the head end. The main jib is received in such a manner that initially it is luffed down onto the transport apparatus and its head end which is then supported on the storage block and extended in the direction of the storage block is coupled thereto. Subsequently, the main jib is detached at its foot end from the rest of the vehicle crane. Using the telescoping capability of the main jib, its still projecting jib portions together with the basic box can then ultimately be drawn onto the transport apparatus quasi by intrinsic force. Running rollers arranged on the basic box roll on the rail-like storage device in order to permit continuous support in the meantime.

Handling of the previously known crane jib-transport unit requires that the supply lines, which for the purpose of removing the main jib can be disconnected from the drive thereof, then have to be temporarily connected to the drive with the integration of extension lines. Beyond the storage block which supports the head end, the rail-like storage device is required, on which at least portions of the basic box of the main jib are guided during its change in length and are placed in a manner ensuring safe transport. The configuration of the storage device requires an adaptation of the main jib of the vehicle crane in order in particular to avoid damage. If a plurality of vehicle cranes belong to a machine pool, each individual machine must initially be retrofitted in a suitable manner with the running rollers. Occasionally, only individual pairings of the crane jib-transport unit and matching vehicle crane can be achieved in this case. Also, the subsequent mounting of a main jib which has been previously detached from the associated vehicle crane and is received on the transport apparatus is sometimes shown to be hindered because possible alignment errors and/or angular offsets between its foot end and the associated coupling point of the vehicle crane can be compensated for only by complex manoeuvring of the transport apparatus and/or orientation of the pivotable superstructure.

Laid-open documents DE 35 32 296 A1 and EP 0 867 399 A1 disclose self-driven tipping container vehicles which are used to pick up and set down container receptacles. Such a tipping container vehicle comprises a loading surface for receiving a container receptacle. The container receptacle is picked up and set down by pivoting load-bearing arms which are articulated to the rear end of the loading surface and of which free end portions can be coupled to the container receptacle for this purpose. The container receptacles are moved on a circular path, which is specified by the structural length of the load-bearing arms, between the ground and the loading surface. The load-bearing arms are pivoted by means of hydraulic cylinders, each of which is integrated between the vehicle frame and one of the load-bearing arms.

SUMMARY OF THE INVENTION

The present invention provides an improved vehicle crane system in which the removal and mounting of the main jib of a vehicle crane and transport can be performed more easily on the whole. Furthermore, two methods are to be demonstrated, by means of which, on the one hand, the receiving of a main jib, which can be detached from a vehicle crane, onto a transport unit and, on the other hand, the connection of a main jib, which is received on a transport unit, to a vehicle crane is simplified.

Accordingly, the vehicle crane system configured in accordance with an aspect of the invention, comprising a vehicle crane having a detachable attachment part, in particular a main jib, and an attachment part-transport unit which is designed to receive the attachment part detached from the vehicle crane and has a mobile transport apparatus for transporting the attachment part now comprises at least one loading arm which is pivotably arranged on the transport apparatus thereof. The at least one loading arm is used for loading the attachment part detached from the vehicle crane. In a particularly preferred manner, the attachment part can be the main jib of a vehicle crane. The at least indirect coupling, over time, to the attachment part required for this purpose is effected via the free load-bearing end of the loading arm, on which the attachment part can be e.g. attached or supported at least during the loading procedure. It is possible by means of the pivotable arrangement of the at least one loading arm on the transport apparatus that an attachment part which is to be loaded or unloaded can easily be moved up onto the transport apparatus or down from the transport apparatus.

The resulting advantage resides in the loading and unloading of an attachment part onto and from the transport apparatus which is possible completely via the at least one loading arm of the attachment part-transport unit of the vehicle crane system. Particularly in the form of a main jib of the attachment part, significantly simplified loading is now possible without having to utilize the hitherto required active telescoping capability thereof. Therefore, the outlay required when mounting and removing an attachment part in the form of a main jib is reduced to a one-time connection or disconnection of its supply lines in each case. Previously, they had to be extended with the temporary integration of intermediate lines in order to be able to activate the drive used for telescoping even when its main jib was in the state where it is removed from the rest of the vehicle crane. In accordance with the invention, the otherwise usual handling of the mostly thick and in this respect heavy supply lines and/or intermediate lines—such as e.g. hydraulic lines—can be omitted, which makes the process easier on the whole and increases user-friendliness considerably. Therefore, the telescoping capability is no longer part of the loading procedure because the main jib which is preferably previously retracted in terms of its length can be loaded onto the transport apparatus and then unloaded therefrom exclusively by means of the at least one loading arm. An additional movement of its head end, which includes in particular the roller head, and/or its opposite foot end by means of telescoping the main jib which is already detached from the vehicle crane is omitted.

Furthermore, the otherwise usual work of converting existing as well as rigging new vehicle cranes is reduced to a minimum or can even be completely omitted because the attachment part-transport unit in accordance with the invention permits almost universal usage. For instance, it is even possible to mostly dispense with fixed points for possible sliding and/or rotating bodies, which are otherwise required and e.g. are to be welded to the segments or portions of the main jib because now the main jib itself no longer has to be supported in a sliding and/or rolling manner via its segments and/or its basic box whilst it is being loaded.

Moreover, according to a preferred development of the basic inventive concept the vehicle crane system can have a storage block which is arranged on the transport apparatus and serves to provide support to an attachment part which is to be loaded or is already loaded. In an advantageous manner, the attachment part can be supported on the storage block via its head end, wherein the remaining part of the attachment part is located in a substantially freely suspended manner above the transport apparatus whilst it is being loaded and when in the loaded state. By reason of the contact, which is thus reduced to only a few clearly defined regions of the attachment part, with the transport apparatus and the apparatuses arranged thereon, possible damage on the attachment part is precluded.

The vehicle crane system can have a storage device which is arranged on the transport apparatus and is provided for supporting an attachment part loaded onto the transport apparatus. The storage device serves as a console, onto which regions of an attachment part which is loaded onto the transport apparatus can be placed. Particularly in combination with the storage block which is preferably spaced apart with respect to the storage device in parallel with the longitudinal direction of the transport apparatus, a dual support option is thus provided for an attachment part. In this manner it is possible to decouple a loaded attachment part from the at least one loading arm in particular while it is being transported on the transport apparatus. By means of preferred possible securing of the attachment part on the storage device and/or the storage block, safe transport thereof on the transport apparatus is ensured. In this case, the term securing means a coupling, over time, of the attachment part to the transport apparatus by means of the storage device and/or the storage block in order to prevent the attachment part from otherwise possibly being displaced or even falling during the rolling transport thereof which is associated with corresponding movements.

In a particularly preferred manner, the storage block can be arranged on the transport apparatus such that it is displaceable in parallel with the longitudinal direction of the apparatus. This provides the possibility of exactly positioning the storage block with respect to the attachment part which is to be loaded in each case and which has a length different from another attachment part. Particularly with regard to the system kinematics provided by the at least one pivotable loading arm, an attachment part which is supported on the displaceable storage block can advantageously move relative to the transport apparatus in that e.g. its head end which is supported on the storage block can be displaced in parallel with the longitudinal direction of the transport apparatus during loading and unloading.

With reference to the arrangement of a storage block, it is considered to be particularly advantageous if it has a configuration which allows the mobility of an attachment part which can be supported thereon. This means that e.g. a head end of the main jib of a vehicle crane can be supported on the storage block in such a tension-free manner as to be able to pivot a foot end of the main jib opposite the head end freely in space at least to a limited extent. In other words, the storage block thus permits quasi articulated support of an attachment part thereon.

In accordance with an aspect of the invention, the at least one loading arm can be arranged in a pivotable manner on the transport apparatus of the vehicle crane system such that an attachment part to be loaded or unloaded can move on a path which contains a movement component in a vertical direction and also in a horizontal direction. Using the example of an attachment part configured as a main jib, a simple movement up and down onto/from the transport apparatus is simply provided, without the active change in length of the main jib being required for this purpose.

The at least one loading arm which is pivotable in order to load an attachment part, such as e.g. a main jib, can advantageously be arranged on the transport apparatus such that an attachment part at least indirectly coupled to the free load-bearing end thereof and at the same time supported with its head end on the displaceable storage block can move accordingly. By means of a pivoting movement of the loading arm, it is now possible to cause an attachment part, which is to be received or loaded, on the one hand to perform a loading movement, effected relative to the transport apparatus, towards the storage device, in particular away from an associated vehicle crane. On the other hand, by means of an opposing pivoting movement of the loading arm, it is possible to cause a received attachment part to perform an unloading movement, effected relative to the transport apparatus, away from the storage device, in particular towards the associated vehicle crane. Both the loading and also the unloading movement are effected as a respectively combined translational and, to a limited extent, rotatory movement relative to the transport apparatus.

The cause for this is the bearing of the attachment part which occurs during the loading over two mutually spaced apart regions, namely on the at least one loading arm and the displaceable storage block. In this manner, its head end supported on the storage block can be displaced during the pivoting movement of the loading arm in parallel with the transport apparatus, while its foot end opposite the head end is moved on a circular path of the loading arm articulated on the transport apparatus. The storage block thereby allows an at least limited rotation such that a head end of an attachment part which is supported thereon permits the pivoting thereof relative to the storage block, the pivoting occurring naturally during loading thereof. By reason of the displaceability of the storage block, it does not form a rigid counter-bearing but instead can follow the kinematics, which are system-imposed by means of the at least one loading arm, in parallel with the longitudinal direction of the transport apparatus and in the meantime can support an attachment part, which is to be loaded or is already loaded or received, in particular on its head end.

Preferably, the vehicle crane system can be configured in such a way that it permits reception of an attachment part, which can be detached from a rotatable superstructure of a vehicle crane, in particular the main jib thereof.

In an advantageous manner, the transport apparatus can be a semi-trailer. This can be produced entirely for the contemplated purpose, or can comprise a commercially available semi-trailer as a base. By selecting a semi-trailer which is suitable in terms of the required dimensions and bearing loads, this can be supplemented e.g. with the required components and thus can be economically assembled to form a transport apparatus in accordance with the invention.

Even if the drive, which is required for loading and unloading an attachment part, could be effected in the form of an active displaceability of the storage block, the invention advantageously provides a pivotability of the at least one loading arm which is active with respect thereto. Of course, a combination of an active drive of the storage block and the at least one loading arm is also feasible. In particular, the preferred active pivotability of the at least one loading arm allows precise guidance of the attachment part coupled thereto, which is of great importance in terms of the possible dimensions and weight of such an attachment part, such as for instance a main jib.

According to a particularly preferred development of the invention, a total of two loading arms can be provided, the arms then being arranged on the transport apparatus in a pivotable manner as a loading assembly. This permits an improved, i.e. more uniform, weight distribution of the attachment part, such as for instance a main jib, to the loading arms. In addition, in use loading arms and the attachment part can then be positioned with respect to each other such that the attachment part, during loading thereof, is located substantially between the two loading arms. The loading arms can be actuated such that the respective pivoting movement(s) thereof can be performed either synchronously with respect to each other and/or in a mutually independent manner. This can occur on the one hand by a rigid connection of the two loading arms, which effects the forcibly mechanical synchronisation thereof. On the other hand, the otherwise mutually independent mobility of the two loading arms can be actuated such that they are movable, as required, either synchronously with respect to each other or in a mutually independent manner. Depending upon the type of coupling of the loading arms, e.g. with a main jib, in particular the mutually independent mobility thereof permits a fine-adjustment in the orientation of its foot end, which can be advantageous in particular during mounting of a main jib.

With regard to the necessary coupling, over time, of an attachment part to the load-bearing end of the at least one loading arm or the load-bearing ends of a pair of loading arms, the invention proposes the use of a detachable holding means. Such a holding means which is associated with the loading arm or the loading assembly can be configured preferably in a flexible manner. In this case, the term flexible does not mean the extensibility thereof but rather the mobility of such a holding means in terms of being non-rigid. Preferably, the holding means can thus be a band or a strap or a combination thereof. Of course, further configurations and combinations are also feasible, e.g. in the form of a chain, in particular a linked chain, and/or a belt and/or a cable. Therefore, a holding means which is configured in this manner does not necessarily require a complementary formation of an attachment part, such as e.g. by means of a connection point which is arranged specifically for this purpose on a main jib and corresponds to the holding means. In other words, such a holding means provides a multiple possible use of the attachment part-transport unit in combination with different attachment parts.

The holding means can be connected if required to the load-bearing end of the at least one loading arm. In a particularly preferred manner, the holding means can be arranged in a detachable manner between the load-bearing ends of two loading arms. In the last-mentioned configuration, a type of flexible bearing is produced, into which it is possible to place the main jib with a jib portion. In the case of an e.g. quasi suspended support of an attachment part, advantageous lateral guidance is achieved at the same time because naturally the flexible holding means is located in a peripheral manner around a part of an attachment part portion from an underside of the attachment part.

With respect to the arrangement of the at least one pivotable loading arm or of the two pivotable loading arms, an articulation point which is as low as possible is considered to be advantageous. For instance, the transport apparatus can have a loading surface which faces a received and substantially horizontally oriented attachment part, such as for instance a main jib. In this context, it is proposed to articulate the loading arm(s) about a rotational spindle beneath the loading surface so that the arm(s) can pivot about the rotational spindle. This allows a lowest possible centre of gravity for the proportionate weight transmission of a received attachment part into the transport apparatus and from there to the ground, e.g. via a running gear unit comprising wheels and/or chains. With respect to an articulation of the loading arm(s) which is possible on or above the loading surface, the low arrangement of the rotational spindle allows it/them to have a longer length, whereby the translational displacement of a received attachment part can be increased accordingly. In other words, a larger range can be achieved in relation to the displacement of an attachment part in parallel with the transport apparatus.

In terms of the drive of the loading arm(s), various configurations are feasible such as for instance in the form of at least one rotary drive arranged in the region of the pivot bearing(s), Preferably, the attachment part-transport unit can have a linear drive which is integrated between the at least one loading arm and the transport apparatus. In the case of the preferred embodiment having two loading arms, such a linear drive can be arranged, as part of the loading assembly, between each of these loading arms and the transport apparatus.

The linear drive in terms of the invention can be any type of such drives which are driven e.g. via actuation of pressure, in particular pneumatically or preferably hydraulically. Accordingly, the linear drive can be e.g. a hydraulic cylinder. In addition or alternatively, this can also be driven via a transmission, in which a rotational movement of a motor is converted into a translational movement of the linear drive, such as e.g. by means of a threaded spindle transmission or ball screw transmission. In each case, a pivoting movement of the loading arm(s) is then based on a change in length of the linear drive(s).

The shape of the at least one loading arm should be adapted to the respective conditions in relation to the configuration of the attachment part-transport unit, taking into consideration the typical design of a vehicle crane. For this purpose, the/each loading arm can preferably have a straight centre portion which extends between two end portions which are bent with respect to one another. In this configuration, each of the two end portions and the centre portion form in each case an angle therebetween. In a preferred manner, the end portions can be bent in the same direction, thus producing an advantageous shape for the loading arm which is bent multiple times in order to effectively avoid any collisions with interfering edges of the vehicle crane and/or the attachment part-transport unit.

In order to obtain an advantageous force ratio in relation to the loading arm(s) and linear drive(s), it is considered to be advantageous if the centre portion of the loading arm has a coupling region which is used for the force-transmitting connection with the linear drive. For instance, the centre portion of the or a loading arm can be connected to a first end of the linear drive, whilst a second end opposite the first end of the linear drive is coupled to the transport apparatus. The coupling between the linear drive and transport apparatus can occur e.g. via a bearing which is arranged on the loading surface of the transport apparatus.

In relation to the shape of the loading arm which is bent multiple times, its end portions can preferably be bent towards a side remote from the linear drive.

According to an advantageous further development, it is feasible that the loading arm is formed in a telescopic manner. This means that its length can change as required, whereby e.g. a larger gap between the loading unit and the vehicle crane can be bridged accordingly. Alternatively or in combination, such an attachment part can also be received further up the transport apparatus if necessary. For this purpose, the loading arm can be formed in multiple parts, e.g. in the form of multiple segments.

The mobile transport apparatus can be configured to move in an active or passive manner. This means that the attachment part-transport unit can be e.g. automatically driven and so this can be moved between its places of usage and/or for manoeuvring in a virtually automotive manner, i.e. by itself. Alternatively or in addition, this can also of course be entrained in the sense of a trailer in relation to its displacement capability. For this purpose, this can preferably be coupled to a suitable towing vehicle—such as for instance an articulated lorry—which entrains the then pulled and/or pushed attachment part-transport unit.

According to a preferred development, the at least one loading arm or the loading assembly can be configured such that it can be operated from a region not necessarily located in the direct proximity. Typically, the drives, arranged on vehicles, for moving such apparatuses are operated e.g. via an operating unit arranged in and/or on the vehicle itself. In this case, the invention provides the advantageous option of operating the loading arm(s) from the outside. This means the operation from outside a vehicle cabin which, in the case of an e.g. automatically driven, mobile transport apparatus, can be part of the thus configured attachment part-transport unit. In a preferred configuration of the attachment part-transport unit, in which the mobile transport apparatus thereof is, or can be, coupled e.g. to a towing vehicle, the vehicle cabin can accordingly be part of this towing vehicle.

In a particularly preferred manner, the actuation of the loading arm or loading unit can occur by means of a wireless or wired operating unit. This provides the greatest flexibility for a person operating the attachment part-transport unit. The possibility for being spatially distant from the attachment part-transport unit offers a considerably better overview in order to ensure an extremely precise actuation of the loading arm or loading unit despite the occasionally considerable dimensions of such vehicle cranes and e.g. the main jib thereof. This is particularly the case in terms of the possibility for compensating for alignment errors and/or angular offsets during the coupling of the main jib and crane vehicle via the separate actuation of two loading arms.

In order to permit the largest possible and most tension-free possible support of a received attachment part, such as e.g. a main jib, it is proposed to arrange at least one holding means accordingly in a movable manner on the load-bearing end of a loading arm or on the load-bearing ends of two loading arms. This means e.g. the at least limited rotatability of the holding means relative to the loading arm, in particular quasi free oscillation. In this manner, the portion of an attachment part in contact with the holding means is always held securely and is protected against possible damage, e.g. by virtue of returning forces of the holding means.

According to a particularly preferred embodiment of the holding means, it can be equipped at least in regions with a slip-resistant surface. In an advantageous manner, a region of the holding means facing the attachment part in the received state is equipped accordingly in order to increase the static friction between the holding means and attachment part accordingly.

The invention makes provision that the transport apparatus of the attachment part-transport unit can have a coupling device which can be detachably connected to a corresponding coupling device of a vehicle crane. The thus possible temporary coupling of the vehicle crane and transport apparatus ensures that no undesired relative movements can occur therebetween, e.g. during the separating or coupling procedure of the main jib. If the coupling permits the preferred transferability of vertical forces, an otherwise necessary vertical support of the transport apparatus can thus be omitted. In fact, the vertical forces occurring on the transport apparatus can be transferred to the vehicle crane via the coupling device(s), which by reason of the omission of a dedicated vertical support permits an extremely economical design of the entire attachment part-transport unit. The coupling devices can be e.g. a trailer coupling.

According to a preferred development of the invention, provision is made to arrange the storage device, which serves to support a loaded attachment part, in a foldable manner on the transport apparatus. The foldable configuration of the storage device allows it to be folded down when it is not being used so as to maximise the space available during loading of an attachment part. In this manner, it is possible for the transport apparatus to be driven substantially underneath an attachment part which projects beyond the rest of the vehicle crane in a horizontal direction, such as e.g.

the main jib thereof, without risking a possible collision with the storage device. Subsequently, the storage device cannot be set up in its functional position e.g. until shortly before the final placement of the attachment part on the transport apparatus in order to be available as a fully adequate support.

The vehicle crane system in accordance with the invention presented here permits extremely simple removal and mounting of the attachment part of a vehicle crane. In particular, in the configuration comprising two loading arms, e.g. a main jib which is detached from the vehicle crane can be transferred to the transport apparatus and re-attached to the vehicle crane within a very short period of time. In combination with the holding means which can be arranged between the load-bearing ends of the loading arms, the portion of the respective attachment part which can be supported therein can be oriented in the horizontal orientation of its foot end, in that the two loading arms are pivoted independently of one another. The single or multiple holding means partially embrace the attachment part, which ensures extremely gentle handling, e.g. with the bottom shell of the basic box of a main jib with regard to deformation, durability, material abrasion, corrosion protection and/or safety.

The invention is further directed to a vehicle crane system which comprises an attachment part-transport unit in accordance with the invention, as previously described, and a towing vehicle which can be coupled or is coupled to a mobile transport apparatus of the attachment part-transport assembly. The invention is also directed to a vehicle crane system which comprises a vehicle crane having a detachable main jib and an attachment part-transport assembly designed to receive the main jib detached from the vehicle crane or an attachment part-transport system.

Furthermore, the invention is directed to a method, in which an attachment part, which can be detached from a vehicle crane, in particular from its rotatable superstructure, in the form of the main jib thereof can be received onto the transport apparatus of an attachment part-transport unit in accordance with the invention, as previously described. The method comprises the following steps: providing the attachment part-transport unit in the extension of the vehicle crane; orienting a longitudinal direction of the main jib of the vehicle crane with respect to a longitudinal direction of the transport apparatus; placing a head end of the main jib on a storage block of the transport apparatus by luffing down the main jib via its luffing cylinder; decoupling the luffing cylinder from the main jib, in particular by removing a head bolt.

In accordance with an aspect of the invention, the method also comprises the steps of: pivoting two loading arms of the attachment part-transport unit in such a manner until both loading arms protrude with their free load-bearing ends into the region of a basic box of the main jib located between the head end and foot end; arranging a holding means between the load-bearing ends of the two loading arms such that the holding means extends as far as a basic box of the main jib, in particular extends through below the basic box of the main jib; establishing a detachable connection between the holding means and basic box, in particular by virtue of the holding means engaging at least partially around the basic box from an underside; pivoting the two loading arms such that the main jib is raised at least on one side via the holding means which at least partially engages around in particular the basic box of the main jib from the underside, and so a detachable connection between the vehicle crane and its main jib is at least partially relieved; disconnecting supply lines between the vehicle crane and its main jib, in particular at the designated couplings; releasing the connection between the main jib and vehicle crane, in particular by removing a foot bolt which connects them together; pivoting the two loading arms in such a manner until the main jib which is supported via the storage block, displaceable in parallel with the longitudinal direction of the transport apparatus, and is coupled indirectly to the load-bearing ends of the loading arms in particular by means of interposition of the holding means is received by means of a combined translational and, to a limited extent, rotatory loading-movement, effected relative to the transport apparatus, away from the vehicle crane onto the transport apparatus and is placed, in particular supported, on a storage device of the transport apparatus.

In an advantageous manner, prior to the loading movement or prior to a step preceding the loading movement, the vehicle crane can be supported in a suitable manner, e.g. via support apparatuses arranged thereon. The support can be effected preferably with respect to the respective ground.

According to a preferred development of the method in accordance with the invention, prior to the loading movement or prior to a step preceding the loading movement, the attachment part-transport unit can be coupled to the vehicle crane. In order to transport the main jib received on the transport apparatus, the support of the vehicle crane is disengaged accordingly and the attachment part-transport unit is decoupled from the rest of the vehicle crane. In an advantageous manner, the main jib can be secured for the purpose of transport on the transport apparatus, such as e.g. by means of suitable transport locking devices.

Furthermore, the invention is directed to a method, in which a main jib which is received or placed on an attachment part-transport unit in accordance with the invention, as already previously described, is connected to an associated vehicle crane. The main jib received in this manner is supported with its head end on a storage block and is supported with a basic box, located between the head end and its foot end opposite thereto, on a storage device. The method comprises the following steps: providing the attachment part-transport unit with the received main jib in the region of the vehicle crane such that the main jib with its foot end at the front is oriented with a coupling point of the vehicle crane corresponding to the foot end thereof and located in particular on a rotatable superstructure.

In accordance with the invention, the method also comprises the steps of: pivoting two loading arms of the attachment part-transport unit in such a manner until the main jib is raised from the storage device of the transport apparatus by virtue of a holding means which is already arranged between the load-bearing ends of the loading arms and is detachably connected to the basic box, in particular by engaging around the basic box from an underside, or is to be arranged beforehand, and is to be detachably connected to the basic box, in particular by engaging around the basic box from an underside, and is moved with its foot end at the front by means of a combined translational and, to a limited extent, rotatory unloading movement, effected on the basis of the pivoting movements of the loading arms relative to the transport apparatus, away from the storage device at least partially towards the vehicle crane; if required, orienting the foot end of the main jib with respect to a corresponding coupling point of the vehicle crane by means of synchronous and/or mutually independent pivoting movements of the loading arms; connecting the main jib to the vehicle crane, in particular by mounting a foot bolt which connects them together; pivoting the two loading arms in such a manner until the holding means which is detachably connected to the basic box of the main jib is relieved; detaching the holding means from the load-bearing ends of the loading arms; connecting supply lines between the vehicle crane and its main jib, in particular at the designated couplings; connecting, beforehand or subsequently, a luffing cylinder of the vehicle crane to the main jib, in particular by mounting a head bolt.

In an advantageous manner, prior to the unloading movement or prior to a step preceding the unloading movement, the vehicle crane can be supported in a suitable manner, e.g. via support apparatuses arranged thereon. The support can be effected preferably with respect to the respective ground.

According to a preferred development of the method in accordance with the invention, prior to the unloading movement or prior to a step preceding the unloading movement, the attachment part-transport unit can be coupled to the vehicle crane. In order to subsequently move and/or use the vehicle crane which is connected to the main jib, the support thereof is disengaged and the attachment part-transport unit is decoupled from the rest of the vehicle crane.

The advantages achieved by the respective method in accordance with the invention have already been disclosed or at least analogously discussed in conjunction with the attachment part-transport unit in accordance with the invention and so at this juncture reference is made to the previous statements in that regard to avoid repetition.

Of course, the methods in accordance with the invention which have been described in greater detail above using the example of a main jib of a vehicle crane can also be applied to other attachment parts. This depends upon the configuration and incorporation of the respective attachment part, also with the measure(s) related to a luffing cylinder being deleted and/or adapted analogously.

An exemplified embodiment of the invention will be explained in greater detail with reference to the following description.

BRIEF DESCRIPTION OF THE DRAWINGS

FIG. 3 shows a detail of the attachment part-transport unit of FIG. 2 in a changed position;

FIG. 4 shows the detail of the attachment part-transport unit of FIG. 3 in the position according to FIG. 2;

FIG. 5 shows an alternative configuration of the attachment part-transport unit of FIG. 4;

FIG. 6 shows a further alternative configuration of the attachment part-transport unit;

FIG. 7 shows the vehicle crane system of FIG. 1 in a first state;

FIG. 8 shows the vehicle crane system 1 of FIG. 7 in a changed state;

FIG. 11 shows the vehicle crane system 1 of FIG. 10 in a changed state; and

FIG. 12 shows the vehicle crane system 1 of FIG. 11 in a changed state.

DESCRIPTION OF THE PREFERRED EMBODIMENTS

Figure 1:
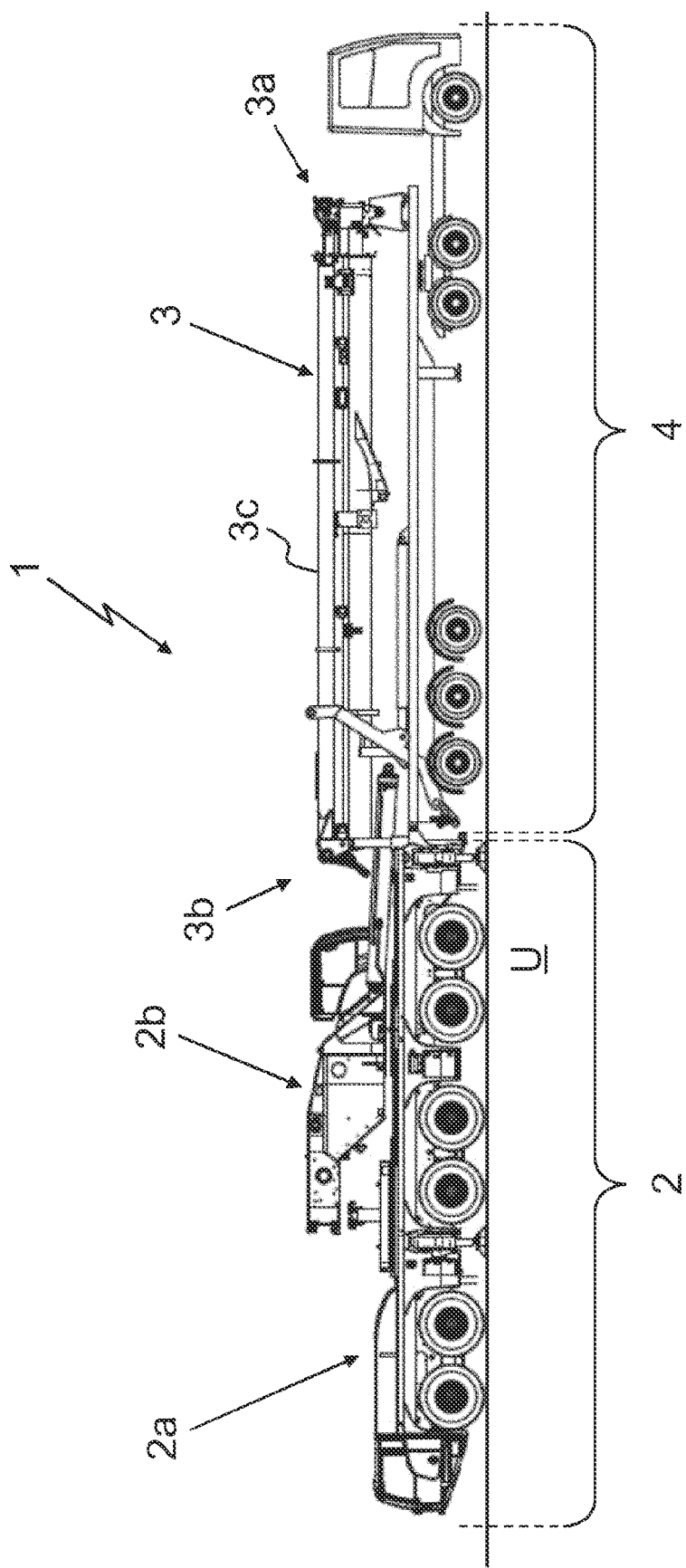
FIG. 1 shows a vehicle crane system in accordance with the invention in a side view.

FIG. 1 shows the structure of a vehicle crane system 1 in accordance with the invention which is parked on a ground U and which comprises a vehicle crane 2 having an attachment part, which can be detached therefrom, in the form of its main jib 3, and an attachment part-transport system 4 in accordance with the invention. As can be seen, the main jib 3 which with its head end 3a is remote from the rest of the vehicle crane 2 is detached with its foot end 3b opposite the head end 3a from a superstructure 2b arranged in a rotatable manner on a lower carriage 2a of the vehicle crane 2, and is placed on the attachment part-transport system 4 for the purpose of being transported separately from the vehicle crane 2. Typically, the main jib 3 is formed from a basic box 3c and telescoping portions guided therein in such a manner so as to be hydraulically telescopic and lockable.

Figure 2:
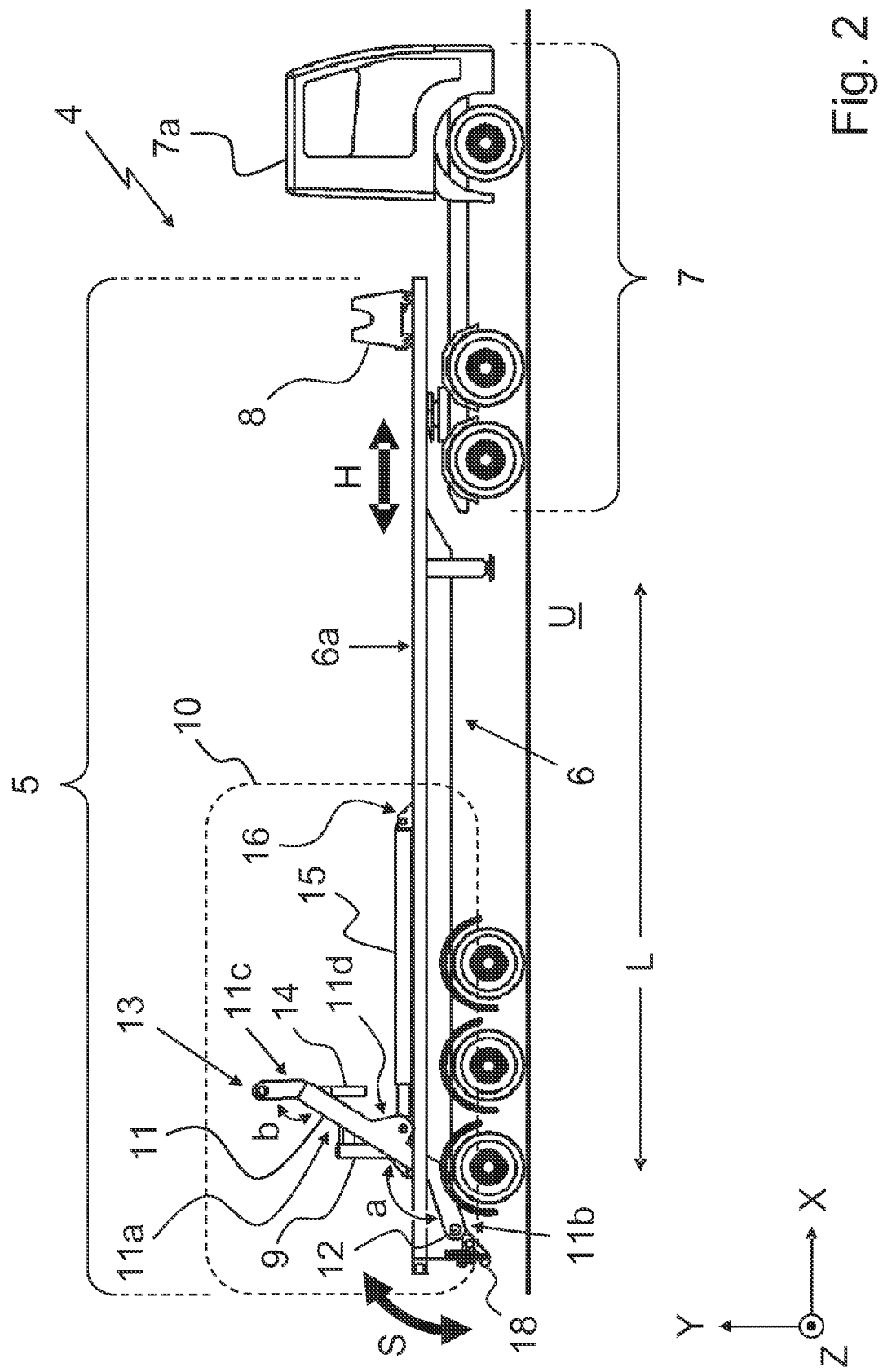
FIG. 2 shows a part of the vehicle crane system 1 of FIG. 1 in the form of an attachment part-transport unit.

FIG. 2 shows the attachment part-transport system 4 of FIG. 1 illustrated in isolation from the vehicle crane 2 and its main jib 3. In this view, it becomes clear that the attachment part-transport system 4 has an attachment part-transport unit 5 with a mobile transport apparatus 6 which serves to receive the main jib 3, not illustrated in greater detail here. The transport apparatus 6 is formed in the present case as a semi-trailer, wherein its mobility is determined by the coupling to a towing vehicle 7 of the attachment part-transport system 4 which, in the form of an articulated lorry, is coupled to the transport apparatus 6. The towing vehicle 7 typically has a vehicle cabin 7a, from which the combination of the attachment part-transport system 4 consisting of the towing vehicle 7 and attachment part-transport unit 5 can be driven in relation to the transport of a main jib 3.

Arranged on the transport apparatus 6 is a storage block 8 which, in the present case, is configured to be displaceable on a loading surface 6a of the transport apparatus 6 remote from the ground U by means of a displacement movement H along the loading surface 6a which is effected in parallel with a longitudinal direction L of the transport apparatus 6 and is possible in opposite directions. The storage block 8 is designed to support a main jib 3, which is received on the transport apparatus 6, in the region of its head end 3a (see FIG. 1). Furthermore, a storage device 9 is provided on the loading surface 6a and is spaced apart from the storage block 8 in relation to the longitudinal direction L, wherein the storage device 9 is located in a region of the rear end of the transport apparatus 6 remote from the vehicle cabin 7a of the towing vehicle 7, whilst the storage block 8 is located in a region of the front end of the transport apparatus 6 opposite the rear end and in this respect is located closer to the vehicle cabin 7a. The storage block 9 is designed to support a main jib 3, which is received on the transport apparatus 6, in the region of its basic box 3c located between its head end 3a and its foot end 3b (see FIG. 1).

In accordance with an aspect of the invention, the attachment part-transport unit 5 has a loading assembly 10 which is located in the region of the storage device 9 and thus in the region of the rear end of the transport apparatus 6. In this case, the loading assembly 10 has two loading arms 11, of which, with reference to the view of FIG. 2, only the loading arm 11 positioned in the foreground can be seen, whilst the rear loading arm 11 which extends in this case in parallel therewith and is perpendicular to the plane of the page is concealed by the loading arm 11 positioned in the foreground. Whilst the longitudinal direction L of the transport apparatus 6 extends in parallel with a horizontal direction X, the two loading arms 11 extend in relation to an upwards direction Y substantially above the loading surface 6a, whilst they are spaced apart from one another in parallel with a vertical direction Z. Both loading arms 11 are articulated to the transport apparatus 6 in a pivotable manner via a common or in each case a dedicated rotational spindle 12 below the loading surface 6. The loading assembly 10 is used for loading and unloading a main jib 3, not illustrated in greater detail here, in that the two loading arms 11 are pivoted about the rotational spindle(s) 12 by means of an active pivoting movement S which is possible in opposite directions. The free load-bearing ends 13 of each loading arm 11 are provided for the at least indirect coupling, over time, to a main jib 3, which in this case can be performed using at least one holding means 14. For this purpose, the holding means 14 is arranged or can be arranged in a detachable manner between the load-bearing ends 13 of the two loading arms 11. In this manner, the holding means 14 can form e.g. a type of loop between the loading arms 11. In order to establish a detachable connection between the holding means 14 and main jib 3, the jib can be placed e.g. with its basic box 3c into the loop formed from the holding means 14. Alternatively or in addition thereto, the main jib 3, in particular its basic box 3c, can have an e.g. annular connection means, such as for instance an eyelet which is welded or otherwise arranged thereon in order to establish a detachable connection between the holding means 14 and the main jib 3 exclusively by means of the eyelet or in combination with a partial engagement around the basic box 3c. In this case, the holding means 14 is formed in a non-rigid manner as a band, strap, cable or chain.

The active performance of the pivoting movement S of the loading arms 11 is effected via linear drives 15, of which, on account of the view of FIG. 2, likewise only the linear drive 15 positioned in the foreground can be seen. Each of these two linear drives 15 is integrated between the transport apparatus 6 and one of the two loading arms 11. The linear drives 15 are preferably hydraulic cylinders. It is likewise feasible to use electric drives.

With regard to the loading arm 11 which is positioned in the foreground and is substantially identical in form to the concealed loading arm 11, it becomes clear that they each have a straight central portion 11a. Each of these central portions 11a extends between two end portions 11b, 11c of the associated loading arm 11 which are bent in the same direction. The end portions 11b, 11c and the central portion 11a of each loading arm 11 each form an angle a, b there between. Preferably, the first angle a which is formed between the lower end portion 11b, located in the region of the rotational spindle 12, and the central portion 11a can correspond to the second angle b which is formed between the upper end portion 11c, located in the region of the load-bearing end 13, and the central portion 11a, as can be seen by way of example. In the present case, the two angles a, b are each from 165° to 135°, preferably from 155° to 145°, e.g. 150°. The two angles a, b can be identical or different from one another.

Each central portion 11a of the two loading arms 11 has a coupling region 11d which in each case is arranged on a side of the associated loading arm 11 remote from the angles a, b. In contrast, the transport apparatus 6 has two bearings 16 which are arranged on its loading surface 6a and are each located substantially in the plane of one of the two loading arms 11. The two linear drives 15 are integrated between the transport apparatus 6 and the respectively associated loading arm 11 such that they are connected to the coupling region 11d of a loading arm 11 in a force-transferring manner via a first end, whereas the second ends thereof opposite the first end are each coupled to one of the bearings 16. In this arrangement, the two end portions 11b, 11c of each loading arm 11 are bent towards a side remote from the associated linear drive 15.

FIGS. 3 to 6 which are described in greater detail hereinafter are each restricted to a detail of the attachment part-transport unit 5 which includes the loading assembly 10 and which shows in each case the region of the rear end of the transport apparatus 6 in order to better illustrate the mode of operation of the loading assembly 10 which includes the loading arms 11 and the linear drives 15.

FIG. 3 shows a receiving state of the two loading arms 11 which is pivoted out to the maximum extent and which is adopted prior to the coupling, over time, of a main jib 3, not visible in greater detail here. The loading assembly 10 is designed and its linear drives 15 can be activated such that the changes in length thereof can be effected separately from one another. For this purpose, a piston rod 15b, of which at least portions are mounted within a cylinder pipe 15a of the respective linear drive 15, is displaced by means of a linear movement M, which is possible in opposite directions, relative to the associated cylinder pipe 15a in the longitudinal direction thereof. In this manner, it is possible to perform the pivoting movements S of the loading arms 11, which movements are based upon a change in length of the linear drives 15, separately from one another. As a result, the pivoting movements S of the respective loading arm 11 can be performed both synchronously with respect to one another and also independently of one another.

In the present case, the two loading arms 11 have evidently been pivoted about the rotational spindle(s) 12 by reason of the linear movements M of the two linear drives 15. By reason of the coupling regions 11d of the loading arms 11, which rotate on a circular path K around the rotational spindles 12, the first end of the linear drives 15 connected in a force-transferring manner thereto is accordingly moved simultaneously. As a result, its first end is raised with respect to the loading surface 6a such that the respective linear drive 15 completes limited rotational movement D which angles the linear drive with respect to the loading surface 6a and is effected around the associated bearing 16.

FIG. 4 illustrates the progression of individual movements of the loading assembly 10, which is opposite to that of FIG. 3, into a placement state which is pivoted-in to the maximum extent which is adopted when a main jib 3, not illustrated in greater detail here, is received onto the transport apparatus 6, or as an inoperative state e.g. during movement of the attachment part-transport unit 5. It can be seen that the loading arms 11 have then been pivoted back around the rotational spindle 12 by means of pivoting movements S effected in the opposite direction, in that the linear drives 15 have been shortened in length by means of a linear movement M effected in the opposite direction. In this regard, the coupling regions 11d of the two loading arms 11 have been rotated once again in the opposite direction on the circular path K around the rotational spindle 12 such that the two linear drives 15 extend in a plane extending in parallel with the loading surface 6a of the transport apparatus 6.

FIG. 5 shows a preferred development of the loading arms 11. It can be seen that they are now split, in that they each have a lower arm part 11e articulated to the rotational spindles 12 and an upper arm part 1 if which can be displaced relative thereto by a telescoping movement T in opposite directions. By reason of the splitting of the loading arms 11, they are correspondingly telescopic in the region of the central portion 11a such that the spacing between the rotational spindle 12 and the free load-bearing end 13 of a loading arm 11 can be adapted, in particular increased or decreased, if required. In this manner, the load-bearing ends 13 of the loading arms 11 can be displaced further towards the foot end 3b of a main jib 3 which is to be received, in order to advantageously reduce an overhang of the main jib 3 beyond the holding means 14 which engages underneath it. The telescoping movement T of the loading arms 11 can be effected either simultaneously or separately from the pivoting movement S thereof.

FIG. 6 shows a further preferred development of the storage device 9. It can be seen that the storage device 9 is arranged such that it can be folded on the loading surface 6a of the transport apparatus 6 by means of a folding movement K in opposite directions. This makes it possible to fold the storage device 9 down accordingly during the time periods when it is not used for storing the main jib 3. The folding-down ensures that the space otherwise required for the storage device 9 erected in the usage position becomes at least partially free in order to facilitate e.g. the displacement of the main jib 3 and/or other parts of the vehicle crane 2. In particular in the moments when possible interfering edges of the main jib 3 and/or other parts of the vehicle crane 2 would otherwise collide with the storage device 9, the required handling and/or manoeuvring space can be freed-up by the folding down of the storage device.

FIGS. 7 to 12 which are described hereinafter show in detail the procedure of receiving the main jib 3 of the vehicle crane 2:

FIG. 7 shows the vehicle crane 2, of which the main jib 3 is to be removed and transported separately e.g. for the purpose of reducing the weight of the pivotable superstructure 2b of the vehicle crane 2. Provided at a distance from the vehicle crane 2 is the attachment part-transport system 4 which is composed of the attachment part-transport unit 5 and towing vehicle 7. It is evident that the head end 3a of the main jib 3, which is already oriented towards the rear end of the transport apparatus 6 of the attachment part-transport unit 5, is raised whilst the vehicle crane 2 is supported with respect to the ground U by means of support apparatuses 17a, 17b. It can be seen that the main jib 3 in this state is slightly luffed up in its longitudinal direction L1 with respect to the longitudinal direction L of the transport apparatus 6 or the horizontal direction X. In a next step, the transport apparatus 6 is brought closer to the vehicle crane 2 by means of the towing vehicle 7, wherein the longitudinal direction X thereof and the longitudinal direction L1 of the main jib are oriented with respect to one another. This means that both longitudinal directions L, L1 thereof extend substantially in a common plane spanned between the horizontal direction X and the upwards direction Z. In this respect, the transport apparatus 6 is moved by means of a travelling movement V so far in the direction of the vehicle crane 2 until it is arranged underneath a portion of the main jib 3.

FIG. 8 shows the vehicle crane system 1 consisting of the vehicle crane 2 and attachment part-transport system 4. It is evident that the attachment part-transport system 4 has been guided by its travelling movement V so close to the vehicle crane 2 until its attachment part-transport unit 5 could be coupled to the vehicle crane 2. For this purpose, the transport apparatus 6 has a coupling device 18 which is now detachably connected to a corresponding coupling device 19 of the vehicle crane 2 (see also FIG. 7). The two coupling devices 18, 19 can be e.g. a trailer coupling or parts of a trailer coupling.

Figure 9:
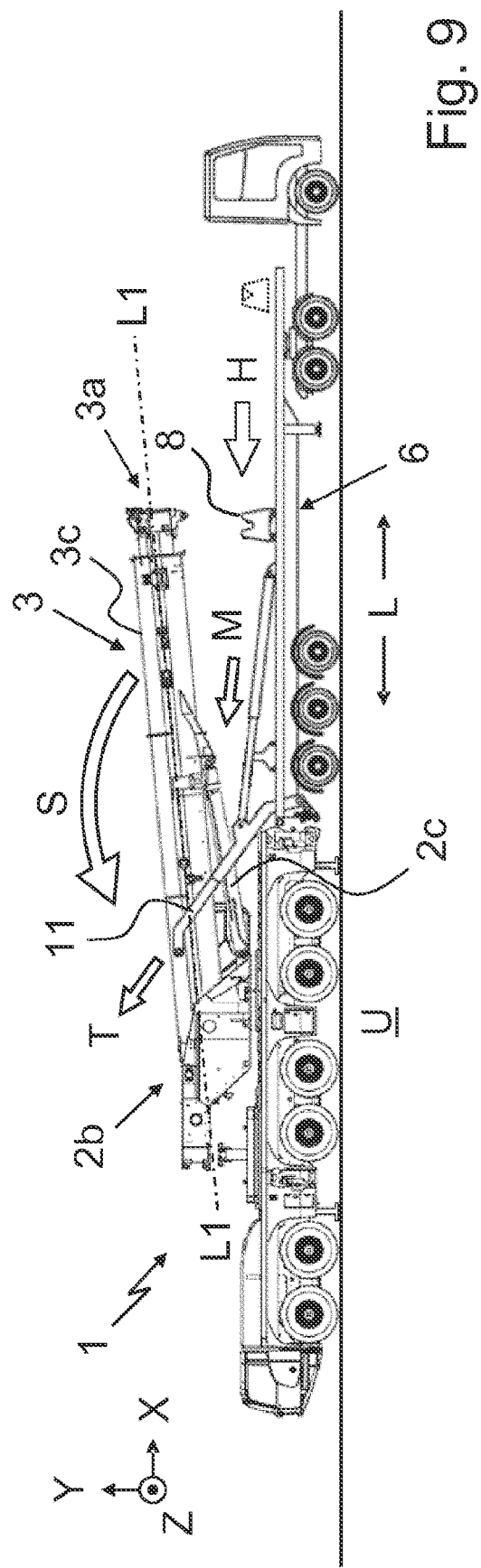
FIG. 9 shows the vehicle crane system 1 of FIG. 8 in a changed state.

FIG. 9 shows that the loading assembly 10 has been prepared for the imminent reception of the main jib 3 by means of a pivoting movement S of the loading arms 11 which is based upon a linear movement M of the linear drives 15. Furthermore, the loading arms 11 have been lengthened in terms of their extension by means of a telescoping movement T, whereby their free load-bearing ends 13 have been displaced as far as possible in the direction of the pivotable superstructure 2b of the vehicle crane 2. Beforehand or afterwards, the storage block 8 has been displaced by means of a displacement movement H in the direction of the vehicle crane 2 so that it is now arranged exactly below the head end 3a of the main jib 3. Alternatively or in addition thereto, it is of course also possible for the head end 3a to be telescoped out accordingly in order to obtain the required relative position between the head end 3a and storage block 8.

Figure 10:
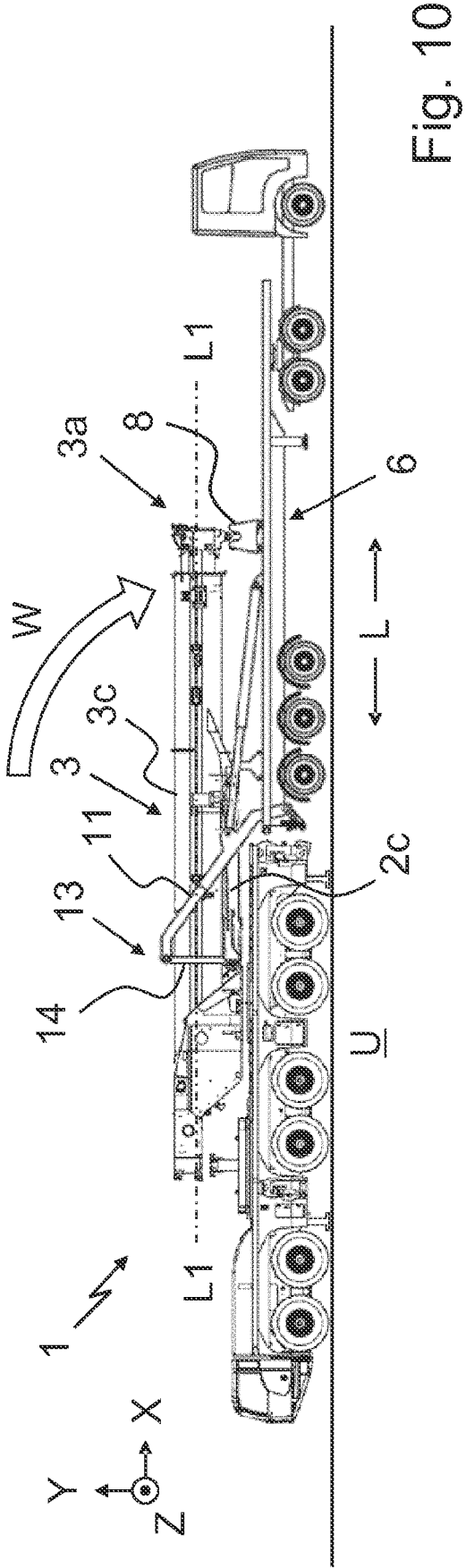
FIG. 10 shows the vehicle crane system 1 of FIG. 9 in a changed state.

FIG. 10 illustrates the subsequent luffing-up of the main jib 3 of the vehicle crane 2 by means of a luffing movement W in the direction of the transport apparatus 6. It can be seen that the luffing movement W of the main jib 3 is effected to such an extent that its head end 3a is now supported on the storage block 8 of the transport apparatus 6. The luffing movement W was effected by actuation of a luffing cylinder 2c of the vehicle crane 2 which is typically arranged between the pivotable superstructure 2b and the main jib 3. Beforehand or afterwards, the holding means 14 was arranged between the load-bearing ends 13 of the two loading arms 11 such that it extends e.g. below the basic box 3c of the main jib 3 in order to establish a detachable connection between the main jib 3 and holding means 14. Alternatively or in addition thereto, the holding means 14 can also be guided by means of a preferably annular connection means—not shown in greater detail here—such as e.g. an eyelet, which for this purpose is arranged at a suitable point on the basic box 3c of the main jib 3. In an advantageous manner, the annular connection means can be located for this purpose e.g. on an upper side of the basic box 3c. Preferably, the holding means 14 can be equipped at least in regions with a slip-resistant surface which is arranged on a region facing the main jib 3.

FIG. 11 shows the separation of the main jib 3 from the vehicle crane 2 and the commencement of the main jib being received onto the transport apparatus 6. It is evident that in the meantime the luffing cylinder 2c has been separated from the main jib 3, e.g. by the removal of a corresponding bolt. Furthermore, the foot end 3b of the main jib 3 has been removed from the superstructure 2b in a manner not shown in greater detail, such that the main jib 3 can now be separated from the vehicle crane 2. For this purpose, e.g. a corresponding bolt has been removed. In order to relieve the connection between the superstructure 2b and main jib 3 in the region of its foot end 3b for the removal, the foot end can already be raised by means of a limited pivoting movement S of the loading arms 11. If not yet done, possible supply lines between the vehicle crane 2 and main jib 2 must also be disconnected at the designated couplings.

By means of a linear movement M of the linear drives 15 which is effected in the opposite direction, the direction of the previous pivoting movement S is now likewise reversed such that the foot end 3b of the main jib 3 is lifted out of the associated bearing on the superstructure 2b by means of a resulting decoupling movement E. At the same time or independently of the pivoting movement S of the loading arms 11, its telescoping movement M is effected such that the loading arms are then correspondingly shortened in terms of their extension. By reason of the main jib 3 which is now mounted only via the storage block 8 and the holding means 14, it is now possible to effect a loading movement A1 which is combined to form a kinematic chain of the individual movements (see also FIG. 4). For this purpose, the linear movements M of the linear drives 15 cause the two loading arms 11 to be pivoted further by means of the resulting pivoting movements S, wherein the storage block 8 is forcibly displaced by means of its passive displacement movement H in parallel with the longitudinal direction L of the transport apparatus 6 in the direction of the vehicle cabin 7a of the towing vehicle 7. As a result, the loading movement A1 constitutes a combined translational and, to a limited extent, rotatory movement of the main jib 3 which is effected relative to the transport apparatus 6 and guides the main jib away from the vehicle crane 2 until it is received onto the transport apparatus 6 and is placed, in particular supported, on the storage device 9 of the transport apparatus 6. By means of a movable arrangement of the holding means 14, it can be oriented in a tension-free manner relative to the load-bearing ends 13 during the pivoting movements S of the loading arms 11.

FIG. 12 illustrates the state of the main jib 3 received on the transport apparatus 6, which is now supported in the region of its foot end 3b at one end on the storage device 9 and also at the other end on the storage block 8. In order to transport the main jib 3, it is initially secured on the transport apparatus 6 in a manner not shown in greater detail. Subsequently, the attachment part-transport unit 5 is then decoupled from the rest of the vehicle crane 2 which, after disengaging its support by raising the support apparatuses 17a, 17b, can likewise be moved by itself separately from its main jib 3.

The connection of the main jib 3 to its vehicle crane 2 is then effected in the correspondingly reverse order by means of a corresponding unloading movement A2 (see FIG. 3), wherein in particular the mutually independent activation of the two loading arms 11 in combination with the mobility, in particular rotatability, of the head end 3a of the main jib 3 on the storage block 8, which is possible at least to a limited extent when the main jib is in the supported state on the storage block 8, can be used both during the loading movement A1 and the unloading movement A2 in order to compensate for possible alignment errors and/or angular offsets between the foot end 3b of the main jib 3 and the associated coupling point on the superstructure 2b of the vehicle crane 2.

The transport apparatus 6 can be e.g. a semi-trailer, an attached trailer, a low loader or a trailer, to name just some of the possible embodiments.

The invention claimed is:

1. A vehicle crane system, the system comprising:
 a vehicle crane having a detachable attachment part comprising a main jib;
 an attachment part-transport unit that is designed to receive the attachment part detached from the vehicle crane and has a mobile transport apparatus for transporting the attachment part;
 at least one loading arm is pivotably arranged on the transport apparatus, wherein the loading arm includes a free load-bearing end configured to be selectively coupled to the attachment part such that the attachment part can be moved onto the transport apparatus or can be moved down from the transport apparatus to be loaded or unloaded; and
 a storage block, wherein the storage block is arranged on the transport apparatus and is designed to support the attachment part in the region of a head end of the attachment part, and wherein the storage block is displaceable in parallel with a longitudinal direction of the transport apparatus.

2. The vehicle crane system as claimed in claim 1, wherein a storage device is arranged on the transport apparatus and is designed to support the attachment part in a region between the head end and a foot end of the attachment part.

3. The vehicle crane system as claimed in claim 2, wherein the attachment part when supported with its head end on the storage block and coupled at least indirectly to the free load-bearing end of the at least one loading arm can be caused to perform by a pivoting movement of the loading arm either (a) a combined translational and a limited rotatory loading movement effected relative to the transport apparatus, towards the storage device and away from the associated vehicle crane, or (b) a combined translational and a limited rotatory unloading movement effected relative to the transport apparatus, away from the storage device and towards the associated vehicle crane.

4. The vehicle crane system as claimed in claim 3, wherein said at least one loading arm comprises two mutually spaced apart loading arms, and wherein the pivoting movements of the loading arms can be performed synchronously with respect to one another and/or independently of one another.

5. The vehicle crane system as claimed in claim 1, wherein the storage block is formed such that the main jib is pivotable in a vertical and/or horizontal plane when in a supported state in which the head end is supported on the storage block.

6. The vehicle crane system as claimed in claim 1, wherein via the pivotable arrangement of the loading arm on the transport apparatus the attachment part is moveable on a path which contains a movement component in a vertical direction and also in a horizontal direction when being loaded or unloaded.

7. The vehicle crane system as claimed in claim 1, wherein the main jib of the attachment part is detachable from a rotatable superstructure of the vehicle crane.

8. The vehicle crane system as claimed in claim 1, wherein the at least one loading arm is configured to be actively pivoted.

9. The vehicle crane system as claimed in claim 1, further comprising at least one holder arranged in a detachable manner on the free load-bearing end of the at least one loading arm or between the free load-bearing ends of two loading arms, and wherein the holder comprises at least one of or a combination of at least two of a band, a strap, a cable, and a chain.

10. The vehicle crane system as claimed in claim 1, wherein the transport apparatus has a loading surface, and wherein the loading arm is configured to be pivoted via a rotational spindle disposed below the loading surface.

11. The vehicle crane system as claimed in claim 1, wherein a linear drive is arranged between the at least one loading arm and the transport apparatus, and wherein a pivoting movement of the loading arm is based upon a change in length of the linear drive.

12. The vehicle crane system as claimed in claim 11, wherein the loading arm has a straight central portion that extends between two end portions that are bent in the same direction, and wherein each end portion and the central portion form an angle there between.

13. The vehicle crane system as claimed in claim 12, wherein the end portions are bent towards a side of the loading arm remote from a linear drive.

14. The vehicle crane system as claimed in claim 1, wherein the at least one loading arm is telescopic.

15. A method for receiving a detachable attachment part onto a transport apparatus of a vehicle crane system, wherein the detachable attachment part comprises a main jib of a vehicle crane and the vehicle crane system further comprises;
   an attachment part-transport unit that is designed to receive the attachment part when detached from the vehicle crane and has the transport apparatus for transporting the attachment part;
   two loading arms pivotably arranged on the transport apparatus, wherein the loading arms each include a free load-bearing end configured to be selectively coupled to the attachment part such that the attachment part can be moved onto the transport apparatus or can be moved down from the transport apparatus to be loaded or unloaded; and
   a storage block, wherein the storage block is arranged on the transport apparatus and is designed to support the attachment part in the region of a head end of the attachment part, and wherein the storage block is displaceable in parallel with a longitudinal direction of the transport apparatus;
said method comprising the steps of:
providing the attachment part-transport unit in extension of the vehicle crane;
orienting a longitudinal direction of the main jib with respect to a longitudinal direction of the transport apparatus;
placing the head end of the main jib on the storage block of the transport apparatus by luffing down the main jib via a luffing cylinder of the main jib;
decoupling the luffing cylinder from the main jib;
pivoting two loading arms of the attachment part-transport unit until both loading arms protrude with their free load-bearing ends into a region of a jib portion of the main jib located between the head end and a foot end;
arranging a holder between the free load-bearing ends of the two loading arms such that the holder extends as far as a basic box of the main jib and through below the basic box of the main jib;
establishing a detachable connection between the holder and the basic box, wherein the holder engages at least partially around the basic box from an underside;
pivoting the two loading arms such that the main jib is raised at least on one side via the holder that at least partially engages around the basic box of the main jib from the underside such that a detachable connection between the vehicle crane and the main jib is at least partially relieved;
disconnecting supply lines between the vehicle crane and the main jib;
releasing the connection between the main jib and the vehicle crane;
pivoting the two loading arms in such a manner until the main jib, which is supported via the storage block to be displaceable in parallel with the longitudinal direction of the transport apparatus, is received onto the transport apparatus and is placed on a storage device of the transport apparatus by a combined translational and a limited rotatory loading movement that is effected relative to the transport apparatus and away from the vehicle crane.

16. The method as claimed in claim 15, wherein prior to the loading movement or prior to a step preceding the loading movement, the vehicle crane is supported with respect to a ground.

17. The method as claimed in claim 15, wherein prior to the loading movement or prior to a step preceding the loading movement, the attachment part-transport unit is coupled to the vehicle crane for transporting the main jib that is received and secured on the transport apparatus, a previously effected support of the vehicle crane is disengaged if required and the attachment part-transport unit is decoupled from the rest of the vehicle crane.

18. A method for connecting a main jib to a vehicle crane, where the main jib includes a basic box located between a head end and a foot end of the main jib, and the main jib is received on a transport apparatus of a vehicle crane system and is supported with the head end on a storage block and is supported with the basic box, and where the vehicle crane system further comprises;
   an attachment part-transport unit that is designed to receive the attachment part detached from the vehicle crane and has the mobile transport apparatus for transporting the attachment part;
   two loading arms pivotably arranged on the transport apparatus, wherein the loading arms include free load-bearing ends configured to be selectively coupled to the attachment part such that the attachment part can be moved onto the transport apparatus or can be moved down from the transport apparatus to be loaded or unloaded; and
   wherein the storage block is arranged on the transport apparatus and is designed to support the attachment part in the region of the head end of the attachment part, and wherein the storage block is displaceable in parallel with a longitudinal direction of the transport apparatus;
said method comprising the steps of:
providing the attachment part-transport unit with the received attachment part in the region of the vehicle crane such that the main jib with its foot end at the front is oriented with a coupling point of the vehicle crane corresponding to the foot end thereof;
pivoting the two loading arms of the attachment part-transport unit in such a manner until the main jib is raised from a storage device of the transport apparatus via a holder that is arranged between the free load-bearing ends of the loading arms and is detachably connected to the basic box by engaging around the basic box from an underside, and wherein the main jib is moved with its foot end at the front by a combined translational and a limited rotatory unloading movement, effected on the basis of pivoting movements of the loading arms relative to the transport apparatus, away from the storage device at least partially towards the vehicle crane and wherein the storage block is displaced in parallel with the longitudinal direction of the transport apparatus;
orienting, if required the foot end of the main jib with respect to a corresponding coupling point of the vehicle crane by synchronous and/or mutually independent pivoting movements of the loading arms;
connecting the attachment part to the vehicle crane;
pivoting the two loading arms in such a manner until the holder that is detachably connected to the basic box of the main jib is relieved;
detaching the holder from the free load-bearing ends of the loading arms;
connecting supply lines between the vehicle crane and the main jib; and
connecting a luffing cylinder of the vehicle crane to the main jib beforehand or subsequently.

19. The method as claimed in claim 18, wherein prior to the unloading movement or prior to a step preceding the unloading movement, the vehicle crane is supported with respect to a ground.

20. The method as claimed in claim 18, wherein prior to the unloading movement or prior to a step preceding the unloading movement, the attachment part-transport unit is coupled to the vehicle crane, and wherein for the purpose of moving and/or using the vehicle crane), a previously effected support is disengaged if required and the attachment part-transport unit is decoupled from the rest of the vehicle crane.

* * * * *

UNITED STATES PATENT AND TRADEMARK OFFICE
CERTIFICATE OF CORRECTION

| | |
|---|---|
| PATENT NO. | : 11,453,577 B2 |
| APPLICATION NO. | : 17/266426 |
| DATED | : September 27, 2022 |
| INVENTOR(S) | : Klaus Meissner et al. |

It is certified that error appears in the above-identified patent and that said Letters Patent is hereby corrected as shown below:

In the Specification

Column 14
Line 59, "1 if" should be --11$f$--

Signed and Sealed this
Twentieth Day of December, 2022

*Katherine Kelly Vidal*

Katherine Kelly Vidal
*Director of the United States Patent and Trademark Office*